United States Patent
Barhorst et al.

(10) Patent No.: US 10,543,556 B2
(45) Date of Patent: Jan. 28, 2020

(54) SYSTEMS AND METHODS FOR WELDING ZINC-COATED WORKPIECES

(71) Applicant: Hobart Brothers LLC, Troy, OH (US)

(72) Inventors: Steven Edward Barhorst, Sidney, OH (US); Joseph C. Bundy, Piqua, OH (US); Mario Anthony Amata, Dublin, OH (US); Tre' Dorell Heflin-King, Dayton, OH (US)

(73) Assignee: HOBART BROTHERS LLC, Troy, OH (US)

( * ) Notice: Subject to any disclaimer, the term of this patent is extended or adjusted under 35 U.S.C. 154(b) by 0 days.

(21) Appl. No.: 14/959,820

(22) Filed: Dec. 4, 2015

(65) Prior Publication Data

US 2016/0082541 A1     Mar. 24, 2016

Related U.S. Application Data

(63) Continuation-in-part of application No. 13/743,178, filed on Jan. 16, 2013, which is a continuation-in-part of application No. 13/596,713, filed on Aug. 28, 2012, now Pat. No. 9,199,341.

(51) Int. Cl.
*B23K 9/173* (2006.01)
*B23K 9/12* (2006.01)

(52) U.S. Cl.
CPC ................................. *B23K 9/173* (2013.01)

(58) Field of Classification Search
None
See application file for complete search history.

(56) References Cited

U.S. PATENT DOCUMENTS

| | | | |
|---|---|---|---|
| 2,053,956 | A | 9/1936 | Humberstone |
| 2,613,304 | A | 10/1952 | Colinet |
| 2,870,047 | A | 1/1959 | Kee |
| 2,895,854 | A | 7/1959 | Rocque |
| 2,900,490 | A | 8/1959 | Petryck |
| 3,036,205 | A | 5/1962 | Masao |
| 3,107,176 | A | 10/1963 | Witherell |

(Continued)

FOREIGN PATENT DOCUMENTS

| | | |
|---|---|---|
| AT | 274513 | 10/2006 |
| CN | 1714984 | 1/2006 |

(Continued)

OTHER PUBLICATIONS

AWS A.36/A5.36M: 2016 An American National Standard.*

(Continued)

*Primary Examiner* — Ibrahime A Abraham
*Assistant Examiner* — Gyounghyun Bae
(74) *Attorney, Agent, or Firm* — McAndrews, Held & Malloy, Ltd.

(57) ABSTRACT

A welding system includes a welding power source configured to provide pulsed electropositive direct current (DCEP), a gas supply system configured to provide a shielding gas flow that is at least 90% argon (Ar), a welding wire feeder configured to provide tubular welding wire. The DCEP, the tubular welding wire, and the shielding gas flow are combined to form a weld deposit on a zinc-coated workpiece, wherein less than approximately 10 wt % of the tubular welding wire is converted to spatter while forming the weld deposit on the zinc-coated workpiece.

18 Claims, 2 Drawing Sheets

(56) References Cited

U.S. PATENT DOCUMENTS

| | | | |
|---|---|---|---|
| 3,124,479 A * | 3/1964 | Witherell | B23K 35/302 |
| | | | 219/146.22 |
| 3,167,450 A | 1/1965 | Masao | |
| 3,318,729 A | 5/1967 | Siegle | |
| 3,342,972 A | 9/1967 | Penberg | |
| 3,345,495 A | 10/1967 | Quaas | |
| 3,452,419 A | 7/1969 | Hillert | |
| 3,453,142 A | 7/1969 | Dorschu | |
| 3,491,225 A | 1/1970 | Oku | |
| 3,501,354 A * | 3/1970 | Long | B23K 35/36 |
| | | | 148/23 |
| 3,519,783 A | 7/1970 | Forsberg | |
| 3,533,152 A | 10/1970 | Gloor | |
| 3,542,998 A | 11/1970 | Huff | |
| 3,554,792 A | 1/1971 | Johnson | |
| 3,555,240 A | 1/1971 | Gloor | |
| 3,558,851 A | 1/1971 | Oku | |
| 3,559,864 A | 2/1971 | Hillert | |
| 3,560,702 A | 2/1971 | Arikawa | |
| 3,620,830 A | 11/1971 | Kramer | |
| 3,625,757 A | 12/1971 | Mott | |
| 3,643,061 A | 2/1972 | Duttera | |
| 3,768,996 A | 10/1973 | Metz | |
| 3,769,099 A * | 10/1973 | DeLong | B23K 35/362 |
| | | | 148/26 |
| 3,778,588 A | 12/1973 | Bishel | |
| 3,783,234 A | 1/1974 | Russell | |
| 3,805,016 A | 4/1974 | Soejima | |
| 3,818,178 A | 6/1974 | Nakabayashi | |
| 3,851,143 A * | 11/1974 | Bishel | B23K 35/3033 |
| | | | 148/26 |
| 3,909,253 A | 9/1975 | Asnis | |
| 3,935,414 A | 1/1976 | Ballass | |
| 3,947,655 A | 3/1976 | Gonzalez | |
| 3,999,036 A * | 12/1976 | Muratov | B23K 35/327 |
| | | | 219/145.22 |
| 4,122,238 A | 10/1978 | Frantzerb, Sr. | |
| 4,131,784 A * | 12/1978 | Kimura | B23K 35/308 |
| | | | 148/23 |
| 4,189,539 A | 2/1980 | Ward | |
| 4,296,921 A | 10/1981 | Hayashi | |
| 4,343,984 A | 8/1982 | Smith | |
| 4,551,610 A | 11/1985 | Amata | |
| 4,593,174 A | 6/1986 | Saito | |
| 4,662,952 A | 5/1987 | Barringer | |
| 4,689,461 A | 8/1987 | Gamberg | |
| 4,721,837 A | 1/1988 | Gamberg | |
| 4,738,389 A * | 4/1988 | Moshier | B22F 3/23 |
| | | | 228/148 |
| 4,843,212 A | 6/1989 | Shneerov | |
| 4,920,254 A | 4/1990 | DeCamp | |
| 4,940,882 A * | 7/1990 | Bates | B23K 35/302 |
| | | | 219/145.23 |
| 5,055,655 A | 10/1991 | Chai | |
| 5,218,757 A | 6/1993 | Kaneko | |
| 5,294,485 A * | 3/1994 | Takao | B05D 7/51 |
| | | | 428/626 |
| 5,300,754 A | 4/1994 | Gonzalez | |
| 5,330,850 A * | 7/1994 | Suzuki | C25D 3/565 |
| | | | 428/623 |
| 5,369,244 A | 11/1994 | Kulikowski | |
| 5,473,139 A * | 12/1995 | Matsui | B23K 9/092 |
| | | | 219/130.51 |
| 5,580,475 A | 12/1996 | Sakai | |
| 5,744,782 A * | 4/1998 | Sampath | B23K 35/3066 |
| | | | 219/137 WM |
| 5,857,141 A * | 1/1999 | Keegan | B23K 35/0266 |
| | | | 148/24 |
| 5,898,022 A | 4/1999 | Maples | |
| 6,339,209 B1 | 1/2002 | Kotecki | |
| 6,410,885 B1 * | 6/2002 | Correia | B23K 1/00 |
| | | | 219/137 PS |
| 6,476,356 B2 | 11/2002 | Kim | |
| 6,608,284 B1 | 8/2003 | Nikodym | |
| 6,723,954 B2 | 4/2004 | Nikodym | |
| 6,940,042 B2 | 9/2005 | Hara | |
| 7,087,859 B2 | 8/2006 | Burt | |
| 7,087,860 B2 | 8/2006 | Nikodym | |
| 7,241,970 B2 * | 7/2007 | Fortain | B23K 9/173 |
| | | | 219/129 |
| 7,521,081 B2 | 4/2009 | Butler | |
| 7,781,701 B2 | 8/2010 | Burt | |
| 7,807,948 B2 | 10/2010 | Katiyar | |
| 7,812,284 B2 | 10/2010 | Narayanan | |
| 8,258,432 B2 | 9/2012 | Narayanan | |
| 8,337,643 B2 * | 12/2012 | Sun | C22C 38/002 |
| | | | 148/332 |
| 8,748,778 B2 * | 6/2014 | Kodama | B23K 9/23 |
| | | | 219/137 R |
| 8,758,901 B2 | 6/2014 | Nakamura | |
| 8,907,248 B2 * | 12/2014 | Amata | B23K 35/0261 |
| | | | 219/137 R |
| 9,199,341 B2 | 12/2015 | Barhorst | |
| 2002/0008096 A1 | 1/2002 | Kim | |
| 2002/0153364 A1 | 10/2002 | North | |
| 2003/0019856 A1 * | 1/2003 | Correia | B23K 1/00 |
| | | | 219/129 |
| 2003/0136765 A1 * | 7/2003 | Miklos | B23K 9/232 |
| | | | 219/74 |
| 2003/0136774 A1 * | 7/2003 | Nikodym | B23K 35/368 |
| | | | 219/137 WM |
| 2003/0178402 A1 | 9/2003 | Nikodym | |
| 2003/0222059 A1 * | 12/2003 | De Kock | B23K 9/042 |
| | | | 219/121.63 |
| 2004/0020912 A1 * | 2/2004 | Hara | B23K 35/3053 |
| | | | 219/145.22 |
| 2004/0084421 A1 | 5/2004 | Bolton | |
| 2004/0187961 A1 | 9/2004 | Crockett | |
| 2005/0040143 A1 * | 2/2005 | Neff | B23K 9/173 |
| | | | 219/74 |
| 2005/0121110 A1 | 6/2005 | Dallam | |
| 2005/0205525 A1 * | 9/2005 | Barhorst | B23K 9/173 |
| | | | 219/74 |
| 2005/0224481 A1 | 10/2005 | Nadzam | |
| 2006/0096966 A1 | 5/2006 | Munz | |
| 2006/0186103 A1 | 8/2006 | Rajan | |
| 2006/0207984 A1 | 9/2006 | Karogal | |
| 2006/0255027 A1 | 11/2006 | Katiyar | |
| 2006/0261054 A1 | 11/2006 | Katiyar | |
| 2006/0278627 A1 | 12/2006 | Burt | |
| 2006/0283848 A1 | 12/2006 | Karogal | |
| 2006/0289394 A1 * | 12/2006 | Revel | B23K 9/126 |
| | | | 219/75 |
| 2008/0000892 A1 | 1/2008 | Hirano | |
| 2008/0206594 A1 * | 8/2008 | Fukuda | B23K 9/173 |
| | | | 428/653 |
| 2009/0017328 A1 * | 1/2009 | Katoh | B23K 9/173 |
| | | | 428/653 |
| 2009/0039065 A1 | 2/2009 | Nakamura | |
| 2009/0095720 A1 * | 4/2009 | Kamei | B23K 26/1429 |
| | | | 219/121.64 |
| 2009/0314759 A1 * | 12/2009 | Schaeffer | B23K 35/00 |
| | | | 219/145.22 |
| 2009/0314760 A1 * | 12/2009 | Mizumoto | B23K 35/304 |
| | | | 219/145.22 |
| 2009/0321404 A1 | 12/2009 | Keegan | |
| 2010/0147818 A1 | 6/2010 | Fondriest | |
| 2011/0017712 A1 * | 1/2011 | Wada | B23K 9/16 |
| | | | 219/121.46 |
| 2011/0114606 A1 | 5/2011 | Suzuki | |
| 2011/0174784 A1 * | 7/2011 | Kamei | B23K 1/14 |
| | | | 219/74 |
| 2011/0240604 A1 | 10/2011 | Panday | |
| 2011/0253691 A1 * | 10/2011 | Kodama | B23K 9/23 |
| | | | 219/137 R |
| 2011/0297658 A1 * | 12/2011 | Peters | B23K 9/02 |
| | | | 219/162 |
| 2013/0012696 A1 | 1/2013 | Adden | |
| 2013/0043219 A1 * | 2/2013 | Peters | B23K 35/0261 |
| | | | 219/72 |
| 2013/0153557 A1 | 6/2013 | Pagano | |

(56) References Cited

U.S. PATENT DOCUMENTS

| | | |
|---|---|---|
| 2013/0193124 A1 | 8/2013 | Peters |
| 2013/0233839 A1* | 9/2013 | Barhorst ................ B23K 35/36 219/137 WM |
| 2013/0270248 A1 | 10/2013 | Barhorst et al. |
| 2013/0292362 A1* | 11/2013 | Fairchild ............. B23K 9/0213 219/74 |
| 2013/0313240 A1 | 11/2013 | Amata et al. |
| 2014/0061166 A1 | 3/2014 | Barhorst |
| 2014/0061175 A1 | 3/2014 | Barhorst |
| 2014/0061179 A1 | 3/2014 | Barhorst |
| 2015/0096965 A1 | 4/2015 | Kawamoto |

FOREIGN PATENT DOCUMENTS

| | | |
|---|---|---|
| CN | 1974106 | 6/2007 |
| CN | 101288918 | 10/2008 |
| CN | 101323057 | 12/2008 |
| CN | 101618486 | 1/2010 |
| CN | 10265792 | 8/2010 |
| CN | 102009286 | 4/2011 |
| CN | 102059476 | 5/2011 |
| CN | 102091881 | 6/2011 |
| CN | 102371444 | 3/2012 |
| CN | 102990244 | 3/2013 |
| CN | 103381525 | 11/2013 |
| CN | 103920965 | 7/2014 |
| CN | 104093517 | 10/2014 |
| EP | 0652071 | 5/1995 |
| EP | 0688630 | 12/1995 |
| EP | 1155769 | 11/2001 |
| EP | 1537940 | 6/2005 |
| EP | 1775060 | 4/2007 |
| EP | 2110195 | 10/2009 |
| EP | 2341159 | 7/2011 |
| GB | 363815 | 12/1931 |
| GB | 863072 | 3/1961 |
| GB | 937063 | 9/1963 |
| GB | 1007039 | 10/1965 |
| GB | 1383304 | 2/1974 |
| GB | 1497347 | 1/1978 |
| JP | S54056045 | 5/1979 |
| JP | S57159294 | 10/1982 |
| JP | S60257992 | 12/1985 |
| SU | 407695 | 12/1973 |
| WO | 8907036 | 8/1982 |
| WO | 2005115680 | 12/2005 |
| WO | 2008004699 | 1/2008 |
| WO | 2014113155 | 7/2014 |

OTHER PUBLICATIONS

Tae-Jin, Kim, et al.; "Characteristics of Pulse MIG Arc Welding with a Wire Melting Rate Change by Current Polarity Effect," Journal of Electrical Engineering & Technology, vol. 2, No. 3, Sep. 1, 2007, pp. 366-372.

"Sodium Carboxymethyl Cellulose," FNP 13/2, 1984.

"Sodium Carboxymethylcellulose: Physical and Chemical Properties," Hercules Incorporated, Aqualon Division, 1999.

"Specification for Stainless Steel Flux Cored and Metal Cored Welding Electrodes and Rods," American Welding Society 4th Edition, AWS 5.22/A5.22M:2010, Aug. 27, 2009, ISBN 978-0-87171-764-1, pp. 3, 18, 19, 28, and 29.

Anonymous; "Sodium Carbonate," Wikipedia, The Free Encyclodedia, http://en.wikipedia.org/wiki/Sodium_carbonate [retrieved on Aug. 5, 2015].

ARC Welding Automotive Components, Chrysler Group LLC Process Standard Category Code: D-1, Sep. 8, 2009, pp. 1-16.

Baker, Cathleen; "Methylcellulose & Sodium Carboxymethylcellulose: Uses in Paper Conservation," The American Institute for Conservation, Fall 1982.

International Search Report from PCT application No. PCT/US2013/056907, dated Dec. 13, 2013, 14 pgs.

International Search Report from PCT application No. PCT/US2013/074533, dated Sep. 30, 2014, 16 pgs.

International Search Report from PCT application No. PCT/US2013/074536, dated Sep. 29, 2014, 6 pgs.

International Search Report from PCT application No. PCT/US2014/059701, dated Jul. 10, 2015, 17 pgs.

International Search Report from PCT application No. PCT/US2015/055184, dated Jan. 27, 2016, 14 pgs.

Du et al., "Welding of Dissimilar Metals", May 31, 1986, pp. 43-44.

Wu et al., "Guide for Selecting Welding Wire (Second Edition)", Jun. 30, 2011, p. 45.

Wu et al., "Welding Technology", Jul. 31, 2002, pp. 133-135.

Palmer et al., "Subsea Pipeline Engineering (Second Edition)", Aug. 31, 2013, p. 46.

Huang et al., "Corrosion Resistance and Corrosion Data of Materials", Jan. 31, 2003, p. 19.

Wen et al., "Development Technology of Welding Rod", Jun. 30, 2001, pp. 69-72.

Xue et al., "Manual of Welding Materials", Jan. 31, 2006, pp. 10-11.

Office Action in CN Patent Application No. 201480055868.2, Mar. 15, 2018 (along with English language machine translation of Office Action).

Stainless Steel Overview (Stainless Plate Products) [retrieved on Sep. 26, 2017]. Retrieved from: <URL:http://http://www.sppusa.com/stainlesssteel_overview.php> (Year: 2017).

* cited by examiner

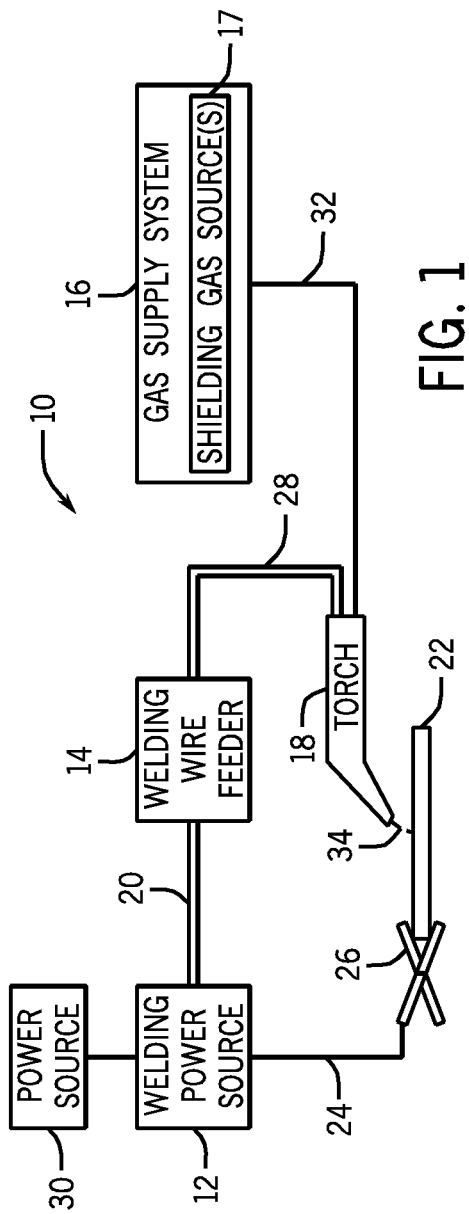
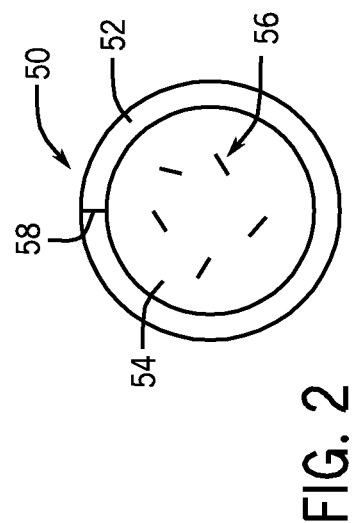
FIG. 1
FIG. 2

SYSTEMS AND METHODS FOR WELDING ZINC-COATED WORKPIECES

CROSS-REFERENCE TO RELATED APPLICATIONS

This application is a continuation-in-part application of U.S. application Ser. No. 13/743,178, entitled "SYSTEMS AND METHODS FOR WELDING ELECTRODES," filed on Jan. 16, 2013, which is a continuation-in-part application of U.S. application Ser. No. 13/596,713, entitled "SYSTEMS AND METHODS FOR WELDING ELECTRODES," filed on Aug. 28, 2012, and issued as U.S. Pat. No. 9,199,341 on Dec. 1, 2015, the disclosures of which are hereby incorporated by reference in their entireties for all purposes.

BACKGROUND

The invention relates generally to welding and, more specifically, to electrodes for arc welding, such as Gas Metal Arc Welding (GMAW) or Flux Core Arc Welding (FCAW).

Welding is a process that has become ubiquitous in various industries for a variety of applications. For example, welding is often used in applications such as shipbuilding, offshore platform, construction, pipe mills, and so forth. Certain welding techniques (e.g., Gas Metal Arc Welding (GMAW), Gas-shielded Flux Core Arc Welding (FCAW-G), and Gas Tungsten Arc Welding (GTAW)), typically employ a shielding gas (e.g., argon, carbon dioxide, or oxygen) to provide a particular local atmosphere in and around the welding arc and the weld pool during the welding process, while others (e.g., Flux Core Arc Welding (FCAW), Submerged Arc Welding (SAW), and Shielded Metal Arc Welding (SMAW)) do not. Additionally, certain types of welding may involve a welding electrode in the form of welding wire. Welding wire may generally provide a supply of filler metal for the weld as well as provide a path for the current during the welding process. Furthermore, certain types of welding wire (e.g., tubular welding wire) may include one or more components (e.g., flux, arc stabilizers, or other additives) that may generally alter the welding process and/or the properties of the resulting weld.

BRIEF DESCRIPTION

In an embodiment, a welding system includes a welding power source configured to provide pulsed electropositive direct current (DCEP), a gas supply system configured to provide a shielding gas flow that is at least 90% argon (Ar), a welding wire feeder configured to provide tubular welding wire. The DCEP, the tubular welding wire, and the shielding gas flow are combined to form a weld deposit on a zinc-coated workpiece, wherein less than approximately 10 wt % of the tubular welding wire is converted to spatter while forming the weld deposit on the zinc-coated workpiece.

In another embodiment, a method of forming a weld deposit on a zinc-coated workpiece includes feeding a tubular welding wire toward a surface of a galvanized workpiece, wherein the tubular welding wire is electrified with pulsed electropositive direct current (DCEP). The method includes directing a flow of shielding gas toward the surface of the galvanized workpiece near the tubular welding wire, wherein the flow of shielding gas is at least 90% argon (Ar). The method further includes forming the weld deposit on the zinc-coated workpiece using the tubular welding wire while providing the flow of shielding gas near the weld deposit, wherein less than approximately 10 wt % of the tubular welding wire is converted to spatter while forming the weld deposit on the zinc-coated workpiece.

DRAWINGS

These and other features, aspects, and advantages of the present invention will become better understood when the following detailed description is read with reference to the accompanying drawings in which like characters represent like parts throughout the drawings, wherein:

FIG. 1 is a block diagram of a gas metal arc welding (GMAW) system, in accordance with embodiments of the present disclosure;

FIG. 2 is a cross-sectional view of a tubular welding wire, in accordance with embodiments of the present disclosure;

DETAILED DESCRIPTION

Figure 3:
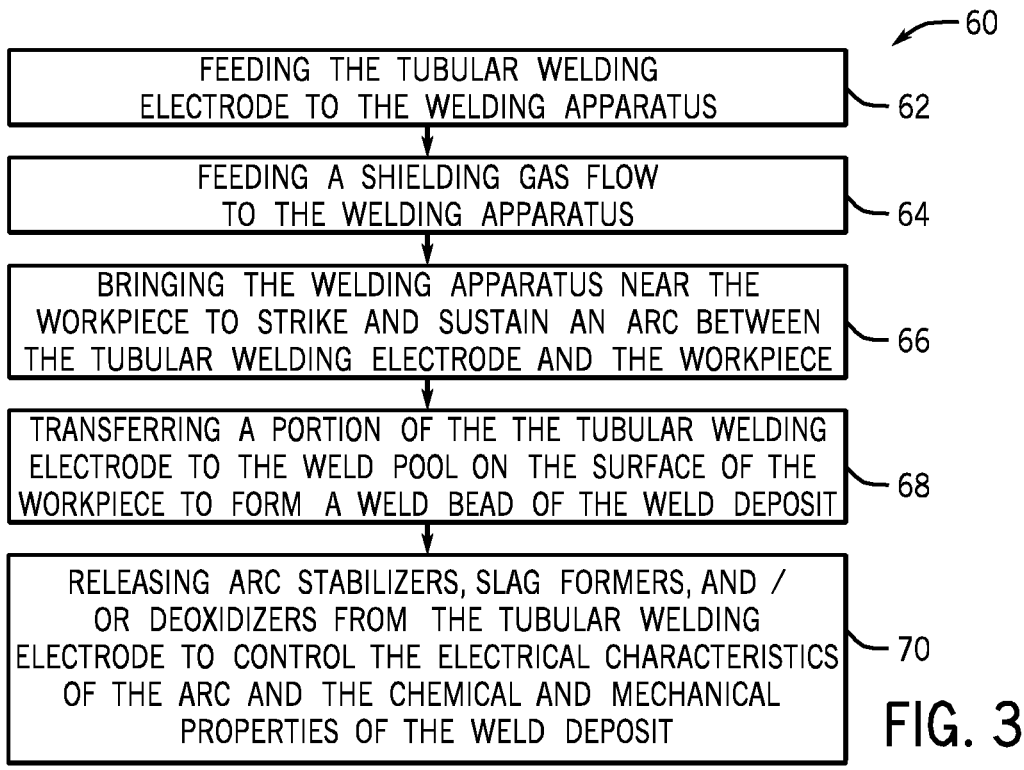
FIG. 3 is a process by which the tubular welding wire may be used to weld a workpiece, in accordance with embodiments of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be appreciated that, as used herein, the term "tubular welding electrode" or "tubular welding wire" may refer to any welding wire or electrode having a metal sheath and a granular or powdered core, such as metal-cored or flux-cored welding electrodes. It should also be appreciated that the term "stabilizer" or "additive" may be generally used to refer to any component of the tubular welding that improves the quality of the arc, the quality of the weld, or otherwise affect the welding process. Furthermore, as used herein, "approximately" may generally refer to an approximate value that may, in certain embodiments, represent a difference (e.g., higher or lower) of less than 0.01%, less than 0.1%, or less than 1% from the actual value. That is, an "approximate" value may, in certain embodiments, be accurate to within (e.g., plus or minus) 0.01%, within 0.1%, or within 1% of the stated value.

As mentioned, certain types of welding electrodes (e.g., tubular welding wire) may include one or more components (e.g., flux, arc stabilizers, or other additives) that may generally alter the welding process and the properties of the resulting weld. For example, certain presently disclosed welding electrode embodiments include an organic stabilizer (e.g., a derivatized cellulose-based component) that may generally improve the stability of the arc while providing a reducing atmosphere conducive to welding coated workpieces. For example, presently disclosed welding electrodes and welding conditions may be especially useful for welding zinc (Zn)-coated workpieces (e.g., galvanized, galvannealed, painted with a Zn-based paint) that include a Zn-rich coating layer at the surface of the workpiece. Certain presently disclosed welding electrode embodiments also include a rare earth silicide component that may generally help to control the shape and penetration of the arc during welding. Furthermore, the disclosed welding electrode embodiments may include other components such as, for example, a carbon component (e.g., graphite, carbon black, or other suitable carbon component), and an agglomerated stabilizer component (e.g., a potassium/titanate/manganate agglomerate), as set forth in detail below.

Accordingly, the presently disclosed welding electrodes enhance the weldability of coated (e.g., galvanized, galvannealed, painted, and so forth) workpieces and/or thinner (e.g., 20-, 22-, 24-gauge, or thinner) workpieces, even at high travel speed (e.g., greater than 40 in/min). Additionally, the disclosed welding electrodes generally enable acceptable welds under different welding configurations (e.g., direct current electrode negative (DCEN), direct current electrode positive (DCEP), alternating currents (AC), and so forth) and/or different welding methods (e.g., involving circular or serpentine welding electrode movements during welding). Additionally, certain presently disclosed welding electrodes may be drawn to particular diameters (e.g., 0.030 in, 0.035 in, 0.040 in, or other suitable diameters) to provide good heat transfer and deposition rates. Furthermore, various welding conditions (e.g., welding processes, polarities, shielding gases) are disclosed that, in combination with the disclosed welding electrodes, enable exceedingly low spatter rates and sound weld deposits when welding Zn-coated workpieces, even at relatively high travel speeds (e.g., greater than 30 inches per minute).

Turning to the figures, FIG. 1 illustrates an embodiment of a gas metal arc welding (GMAW) system 10 that utilizes a welding electrode (e.g., tubular welding wire) in accordance with the present disclosure. It should be appreciated that, while the present discussion may focus specifically on the GMAW system 10 illustrated in FIG. 1, the presently disclosed welding electrodes may benefit any arc welding process (e.g., FCAW, FCAW-G, GTAW, SAW, SMAW, or similar arc welding process) that uses a welding electrode. It may be appreciated that, in certain embodiments, the GMAW system 10 may be capable of manual welding, semi-automated welding, or fully automated welding operations. The welding system 10 includes a welding power source 12, a welding wire feeder 14, a gas supply system 16, and a welding torch 18. The welding power source 12 generally supplies power to the welding system 10 and may be coupled to the welding wire feeder 14 via a cable bundle 20 as well as coupled to a workpiece 22 using a lead cable 24 having a clamp 26. In the illustrated embodiment, the welding wire feeder 14 is coupled to the welding torch 18 via a cable bundle 28 in order to supply consumable, tubular welding wire (i.e., the welding electrode) and power to the welding torch 18 during operation of the welding system 10. In another embodiment, the welding power unit 12 may couple and directly supply power to the welding torch 18.

The welding power source 12 may generally include power conversion circuitry that receives input power from an alternating current power source 30 (e.g., an AC power grid, an engine/generator set, or a combination thereof), conditions the input power, and provides DC or AC output power via the cable 20. As such, the welding power source 12 may power the welding wire feeder 14 that, in turn, powers the welding torch 18, in accordance with demands of the welding system 10. The lead cable 24 terminating in the clamp 26 couples the welding power source 12 to the workpiece 22 to close the circuit between the welding power source 12, the workpiece 22, and the welding torch 18. The welding power source 12 may include circuit elements (e.g., transformers, rectifiers, switches, and so forth) capable of converting the AC input power to a direct current electrode positive (DCEP) output, direct current electrode negative (DCEN) output, DC variable polarity, pulsed DC, or a variable balance (e.g., balanced or unbalanced) AC output, as dictated by the demands of the welding system 10. It should be appreciated that the presently disclosed welding electrodes (e.g., tubular welding wire) may enable improvements to the welding process (e.g., improved arc stability and/or improved weld quality) for a number of different power configurations. As discussed in greater detail below, in certain embodiments, the use of pulsed DC may enable benefits in terms of low spatter rates and low weld deposit porosity when welding Zn-coated workpieces, especially at high travel speeds.

The illustrated welding system 10 includes a gas supply system 16 that supplies a shielding gas or shielding gas mixtures from one or more shielding gas sources 17 to the welding torch 18. In the depicted embodiment, the gas supply system 16 is directly coupled to the welding torch 18 via a gas conduit 32. In another embodiment, the gas supply system 16 may instead be coupled to the wire feeder 14, and the wire feeder 14 may regulate the flow of gas from the gas supply system 16 to the welding torch 18. A shielding gas, as used herein, may refer to any gas or mixture of gases that may be provided to the arc and/or weld pool in order to provide a particular local atmosphere (e.g., to shield the arc, improve arc stability, limit the formation of metal oxides, improve wetting of the metal surfaces, alter the chemistry of the weld deposit, and so forth). In certain embodiments, the shielding gas flow may be a shielding gas or shielding gas mixture (e.g., argon (Ar), helium (He), carbon dioxide ($CO_2$), oxygen ($O_2$), nitrogen ($N_2$), similar suitable shielding gases, or any mixtures thereof). For example, a shielding gas flow (e.g., delivered via the conduit 32) may include Ar, $Ar/CO_2$ mixtures, $Ar/CO_2/O_2$ mixtures, Ar/He mixtures, and so forth. By specific example, in certain embodiments, the shielding gas flow may include 90% Ar and 10% $CO_2$. As discussed in greater detail below, in certain embodiments, the use of 100% Ar shielding gas may enable benefits in terms of low spatter rates and low weld deposit porosity when welding Zn-coated workpieces, especially at high travel speeds.

Accordingly, the illustrated welding torch 18 generally receives the welding electrode (i.e., the tubular welding wire), power from the welding wire feeder 14, and a shielding gas flow from the gas supply system 16 in order to perform GMAW of the workpiece 22. During operation, the welding torch 18 may be brought near the workpiece 22 so that an arc 34 may be formed between the consumable welding electrode (i.e., the welding wire exiting a contact tip of the welding torch 18) and the workpiece 22. Additionally, as discussed below, by controlling the composition of the welding electrode (i.e., the tubular welding wire), the chemistry of the arc 34 and/or the resulting weld (e.g., composition and physical characteristics) may be varied. For example, the welding electrode may include fluxing or alloying components that may affect the welding process (e.g., act as arc stabilizers) and, further, may become at least partially incorporated into the weld, affecting the mechanical properties of the weld. Furthermore, certain components of the welding electrode (i.e., welding wire) may also provide additional shielding atmosphere near the arc, affect the transfer properties of the arc 34, deoxidize the surface of the workpiece, and so forth.

A cross-section of an embodiment of the presently disclosed welding wire is illustrated in FIG. 2. FIG. 2 illustrates a tubular welding wire 50 that includes a metallic sheath 52, which encapsulates a granular or powdered core 54 (also referred to as filler). In certain embodiments, the tubular welding wire 50 may comply with one or more American Welding Society (AWS) standards. For example, in certain embodiments, the tubular welding wire 50 may be in accordance with AWS A5.18 ("SPECIFICATION FOR CARBON STEEL ELECTRODES AND RODS FOR GAS SHIELDED ARC WELDING") and/or with AWS A5.36 ("SPECIFICATION FOR CARBON AND LOW-ALLOY STEEL FLUX CORED ELECTRODES FOR FLUX CORED ARC WELDING AND METAL CORED ELECTRODES FOR GAS METAL ARC WELDING").

The metallic sheath 52 of the tubular welding wire 50 illustrated in FIG. 2 may be manufactured from any suitable metal or alloy, such as steel. It should be appreciated that the composition of the metallic sheath 52 may affect the composition of the resulting weld and/or the properties of the arc 34. In certain embodiments, the metallic sheath 52 may account for between approximately 80% and 90% of the total weight of the tubular welding wire 50. For example, in certain embodiments, the metallic sheath 52 may provide approximately 84% or approximately 86% of the total weight of the tubular welding wire 50.

As such, the metallic sheath 52 may include certain additives or impurities (e.g., alloying components, carbon, alkali metals, manganese, or similar compounds or elements) that may be selected to provide desired weld properties. In certain embodiments, the metallic sheath 52 of the tubular welding wire 50 may be a low-carbon strip that includes a relatively small (e.g., lower or reduced) amount of carbon (e.g., less than approximately 0.06%, less than approximately 0.07%, or less than approximately 0.08% carbon by weight). For example, in an embodiment, the metallic sheath 52 of the tubular welding wire 50 may include between approximately 0.07% and 0.08% carbon by weight. Additionally, in certain embodiments, the metallic sheath 52 may be made of steel generally having a small number of inclusions. For example, in certain embodiments, the metallic sheath 52 may include between approximately 0.25% and approximately 0.5%, or approximately 0.34% manganese by weight. By further example, in certain embodiments, the metallic sheath 52 may include less than approximately 0.02% phosphorus or sulfur by weight. The metallic sheath 52, in certain embodiments, may also include less than approximately 0.04% silicon by weight, less than approximately 0.05% aluminum by weight, less than approximately 0.1% copper by weight, and/or less than approximately 0.02% tin by weight.

The granular core 54 of the illustrated tubular welding wire 50 may generally be a compacted powder. In certain embodiments, the granular core 54 may account for between approximately 7% and approximately 40%, or between approximately 10% and approximately 20%, of the total weight of the tubular welding wire 50. For example, in certain embodiments, the granular core 54 may provide approximately 14%, approximately 15%, or approximately 16% of the total weight of the tubular welding wire 50. Furthermore, in certain embodiments, the components of the granular core 54, discussed below, may be homogenously or non-homogenously (e.g., in clumps or clusters 56) disposed within the granular core 54. For example, the granular core 54 of certain welding electrode embodiments (e.g., metal-cored welding electrodes) may include one or more metals (e.g., iron, iron titanium, iron silicon, or other alloys or metals) that may provide at least a portion of the filler metal for the weld. By specific example, in certain embodiments, the granular core 54 may include between approximately 70% and approximately 75% iron powder, as well as other alloying components, such as ferro-titanium (e.g., 40% grade), ferro-magnesium-silicon, and ferro-silicon powder (e.g., 50% grade, unstabilized). Other examples of components that may be present within the tubular welding wire 50 (i.e., in addition to the one or more carbon sources and the one or more alkali metal and/or alkali earth metal compounds) include other stabilizing, fluxing, and alloying components, such as may be found in METALLOY X-CEL™ welding electrodes available from Illinois Tool Works, Inc.

Additionally, presently disclosed embodiments of the tubular welding wire 50 may include an organic stabilizer disposed in the granular core 54. The organic stabilizer may be any organic molecule that includes one or more alkali metal ions (e.g., Group I: lithium (Li), sodium (Na), potassium (K), rubidium (Rb), cesium (Cs)) or alkali earth metal ions (e.g., Group II: beryllium (Be), magnesium (Mg), calcium (Ca), strontium (Sr), or barium (Ba)). That is, in certain embodiments, the organic stabilizer includes an organic subcomponent (e.g., an organic molecule or polymer), which includes carbon, hydrogen, and oxygen, and may be chemically (e.g., covalently or ionically) bonded to the alkali metal or alkali earth metal ions. In other embodiments, the organic stabilizer may include an organic subcomponent (e.g., an organic molecule or polymer, such as cellulose) that has been mixed with (e.g., not chemically bonded with) the alkali metal and/or alkali earth metal salt (e.g., potassium oxide, potassium sulfate, sodium oxide, etc.).

By specific example, in certain embodiments, the organic stabilizer may be a cellulose-based (e.g., cellulosic) component including a cellulose chain that has been derivatized to form a sodium or potassium salt (e.g., sodium or potassium carboxymethyl cellulose). For example, in certain embodiments, the cellulose-based organic stabilizer may be sodium carboxymethyl cellulose having a degree of substitution (DS) ranging from approximately 0.5 and approximately 2.5. In general, the DS of a derivatized cellulose may be a real number between 0 and 3, representing an average number of substituted hydroxyl moieties in each monomer unit of the polysaccharide. In other embodiments, the organic stabilizer may be other organic molecules that include one or more Group I/Group II ions. For example, in certain embodiments, the organic stabilizer may include derivatized sugars (e.g., derivatized sucrose, glucose, etc.) or polysaccharides having one or more carboxylic acids or sulfate moieties available to form an alkali metal or alkali earth metal salt. In other embodiments, the organic stabilizer may include soap-like molecules (e.g., sodium dodecyl sulfate or sodium stearate) or alginates. Additionally, in certain embodiments, the organic stabilizer may account for less than approximately 10%, between approximately 0.05% and approximately 5%, between approximately 0.1% and approximately 3%, between approximately 0.25% and approximately 2.5%, between approximately 0.5% and approximately 1.5%, or approximately 1% of the granular core 54 by weight. Additionally, in certain embodiments, the organic stabilizer may account for less than approximately 5%, between approximately 0.05% and approximately 3%, between approximately 0.08% and approximately 2%, between approximately 0.1% and approximately 1%, or approximately 0.15% of the tubular welding wire 50 by weight.

It may be appreciated that the organic stabilizer component of the tubular welding wire 50 may be maintained at a suitable level such that a reducing environment (e.g., hydrogen-rich) may be provided near the welding arc, but without introducing substantial porosity into the weld. It should further be appreciated that utilizing an organic molecule as a delivery vehicle for at least a portion of the Group I/Group II ions to the welding arc, as presently disclosed, may not be widely used since organic molecules may generate hydrogen under the conditions of the arc, which may result in porous and/or weak welds for mild steels. However, as set forth below, using the presently disclosed organic stabilizers afford quality welds (e.g., low-porosity welds), even when welding at high travel speed on coated (e.g., galvanized) and/or thin workpieces.

Additionally, presently disclosed embodiments of the tubular welding wire 50 may also include a carbon component disposed in the granular core 54. For example, the carbon source present in the granular core 54 and/or the metal sheath 52 may be in a number of forms and may stabilize the arc 34 and/or increase the carbon content of the weld. For example, in certain embodiments, graphite, graphene, nanotubes, fullerenes and/or similar substantially $sp^2$-hybridized carbon sources may be utilized as the carbon source in the tubular welding wire 50. Furthermore, in certain embodiments, graphene or graphite may be used to also provide other components (e.g., moisture, gases, metals, and so forth) that may be present in the interstitial space between the sheets of carbon. In other embodiments, substantially $sp^a$-hybridized carbon sources (e.g., micro- or nano-diamond, carbon nanotubes, buckyballs) may be used as the carbon source. In still other embodiments, substantially amorphous carbon (e.g., carbon black, lamp black, soot, and/or similar amorphous carbon sources) may be used as the carbon source.

Furthermore, while the present disclosure may refer to this component as a "carbon source," it should be appreciated that the carbon source may be a chemically modified carbon source that may contain elements other than carbon (e.g., oxygen, halogens, metals, and so forth). For example, in certain embodiments, the tubular welding wire 50 may include a carbon black component in the granular core 54 that may contain a manganese content of approximately 20%. In certain embodiments, the carbon component of the tubular welding wire 50 may be powdered or granular graphite. Additionally, in certain embodiments, the carbon component may account for less than approximately 10%, between approximately 0.01% and approximately 5%, between approximately 0.05% and approximately 2.5%, between approximately 0.1% and approximately 1%, or approximately 0.5% of the granular core 54 by weight. In certain embodiments, the carbon component may account for less than approximately 5%, between approximately 0.01% and approximately 2.5%, between approximately 0.05% and approximately 0.1%, or approximately 0.08% of the tubular welding wire 50 by weight.

Furthermore, in addition to the organic stabilizer discussed above, the tubular welding wire 50 may also include one or more inorganic stabilizers to further stabilize the arc 34. That is, the granular core 54 of the tubular welding wire 50 may include one or more compounds of the Group 1 and Group 2 elements (e.g., Li, Na, K, Rb, Cs, Be, Mg, Ca, Sr, Ba). A non-limiting list of example compounds include: Group 1 (i.e., alkali metal) and Group 2 (i.e., alkaline earth metal) silicates, titanates, carbonates, halides, phosphates, sulfides, hydroxides, oxides, permanganates, silicohalides, feldspars, pollucites, molybdenites, and molybdates. For example, in an embodiment, the granular core 54 of the tubular welding wire 50 may include potassium manganese titanate, potassium sulfate, sodium feldspar, potassium feldspar, and/or lithium carbonate. By specific example, the granular core 54 may include potassium silicate, potassium titanate, potassium alginate, potassium carbonate, potassium fluoride, potassium phosphate, potassium sulfide, potassium hydroxide, potassium oxide, potassium permanganate, potassium silicofluoride, potassium feldspar, potassium molybdates, or a combination thereof as the potassium source. Similar examples of stabilizing compounds that may be used are described in U.S. Pat. No. 7,087,860, entitled "STRAIGHT POLARITY METAL CORED WIRES," and U.S. Pat. No. 6,723,954, entitled "STRAIGHT POLARITY METAL CORED WIRE," which are both incorporated by reference in their entireties for all purposes.

Furthermore, for certain embodiments of the presently disclosed tubular welding wire 50, one or more inorganic stabilizers may be included in the granular core 54 in the form of an agglomerate or frit. That is, certain embodiments of the tubular welding wire 50 may include one or more of the inorganic stabilizers described above in an agglomerate or frit that may stabilize the arc during welding. The term "agglomerate" or "frit," as used herein, refers to a mixture of compounds that have been fired or heated in a calciner or oven such that the components of the mixture are in intimate contact with one another. It should be appreciated that the agglomerate may have subtly or substantially different chemical and/or physical properties than the individual components of the mixture used to form the agglomerate. For example, agglomerating, as presently disclosed, may provide a frit that is better suited for the weld environment than the non-agglomerated materials.

In certain embodiments, the granular core 54 of the tubular welding wire 50 may include an agglomerate of one or more alkali metal or alkaline earth metal compounds (e.g., potassium oxide, sodium oxide, calcium oxide, magnesium oxide, or other suitable alkali metal or alkaline earth metal compound). In other embodiments, the granular core 54 of the tubular welding wire 50 may include an agglomerate of a mixture of alkali metal or alkaline earth metal compound and other oxides (e.g., silicon dioxide, titanium dioxide, manganese dioxide, or other suitable metal oxides). For example, one embodiment of a tubular welding wire 50 may include an agglomerated potassium source including of a mixture of potassium oxide, silica, and titania. By further example, another embodiment of a tubular welding wire 50 may include in the granular core 54 another stabilizing agglomerate having a mixture of potassium oxide (e.g., between approximately 22% and 25% by weight), silicon oxide (e.g., between approximately 10% and 18% by weight), titanium dioxide (e.g., between approximately 38% and 42% by weight), and manganese oxide or manganese dioxide (e.g., between approximately 16% and 22% by weight). In certain embodiments, an agglomerate may include between approximately 5% and 75% alkali metal and/or alkaline earth metal compound (e.g., potassium oxide, calcium oxide, magnesium oxide, or other suitable alkali metal and/or alkaline earth metal compound) by weight, or between approximately 5% and 95% alkali metal and/or alkaline earth metal (e.g., potassium, sodium, calcium, magnesium, or other suitable alkali metal and/or alkaline earth metal) by weight. Furthermore, in certain embodiments, other chemical and/or physical factors (e.g., maximizing alkali metal and/or alkaline earth metal loading, acidity, stability, and/or hygroscopicity of the agglomerate) may be considered when selecting the relative amounts of each component present in the agglomerate mixture. Additionally, in certain embodiments, the agglomerate may account for less than approximately 10%, between approximately 0.1% and approximately 6%, between approximately 0.25% and approximately 2.5%, between approximately 0.5% and approximately 1.5%, or approximately 1% of the granular core 54 by weight. In certain embodiments, the agglomerate may account for less than approximately 5%, between approximately 0.05% and approximately 2.5%, between approximately 0.1% and approximately 0.5%, or approximately 0.15% of the tubular welding wire 50 by weight.

Additionally, the granular core 54 of the tubular welding wire 50 may also include other components to control the welding process. For example, rare earth elements may generally affect the stability and heat transfer characteristics of the arc 34. As such, in certain embodiments, the tubular welding wire 50 may include a rare earth component, such as the Rare Earth Silicide (e.g., available from Miller and Company of Rosemont, Ill.), which may include rare earth elements (e.g., cerium and lanthanum) and other non-rare earth elements (e.g., iron and silicon). In other embodiments, any material including cerium or lanthanum (e.g., nickel lanthanum alloys) may be used in an amount that does not spoil the effect of the present approach. By specific example, in certain embodiments, the rare earth component may account for less than approximately 10%, between approximately 0.01% and approximately 8%, between approximately 0.5% and approximately 5%, between approximately 0.25% and approximately 4%, between approximately 1% and approximately 3%, between approximately 0.75% and approximately 2.5%, or approximately 2% of the granular core 54 by weight. In certain embodiments, the rare earth component may account for less than approximately 5%, between approximately 0.01% and approximately 2.5%, between approximately 0.1% and approximately 0.75%, or approximately 0.3% of the tubular welding wire 50 by weight.

Furthermore, the tubular welding wire 50 may, additionally or alternatively, include other elements and/or minerals to provide arc stability and to control the chemistry of the resulting weld. For example, in certain embodiments, the granular core 54 and/or the metallic sheath 52 of the tubular welding wire 50 may include certain elements (e.g., titanium, manganese, zirconium, fluorine, or other elements) and/or minerals (e.g., pyrite, magnetite, and so forth). By specific example, certain embodiments may include zirconium silicide, nickel zirconium, or alloys of titanium, aluminum, and/or zirconium in the granular core 54. In particular, sulfur containing compounds, including various sulfide, sulfate, and/or sulfite compounds (e.g., such as molybdenum disulfide, iron sulfide, manganese sulfite, barium sulfate, calcium sulfate, or potassium sulfate) or sulfur-containing compounds or minerals (e.g., pyrite, gypsum, or similar sulfur-containing species) may be included in the granular core 54 to improve the quality of the resulting weld by improving bead shape and facilitating slag detachment, which may be especially useful when welding galvanized workpieces, as discussed below. Furthermore, in certain embodiments, the granular core 54 of the tubular welding wire 50 may include multiple sulfur sources (e.g., manganese sulfite, barium sulfate, and pyrite), while other embodiments of the tubular welding wire 50 may include only a single sulfur source (e.g., potassium sulfate) without including a substantial amount of another sulfur source (e.g., pyrite or iron sulfide). For example, in an embodiment, the granular core 54 of the tubular welding wire 50 may include between approximately 0.01% and approximately 0.5%, or approximately 0.2% potassium sulfate.

Generally speaking, the tubular welding wire 50 may generally stabilize the formation of the arc 34 to the workpiece 22. As such, the disclosed tubular welding wire 50 may improve more than one aspect of the welding process (e.g., deposition rate, travel speed, splatter, bead shape, weld quality, etc.). It should further be appreciated that the improved stability of the arc 34 may generally enable and improve the welding of coated metal workpieces and thinner workpieces. For example, in certain embodiments, the coated metal workpieces may include galvanized, galvanealed (e.g., a combination of galvanization and annealing), or similar zinc-coated workpieces. A non-limiting list of example coated workpieces further includes dipped, plated (e.g., nickel-plated, copper-plated, tin-plated, or electroplated or chemically plated using a similar metal), chromed, nitrite-coated, aluminized, or carburized workpieces. For example, in the case of galvanized workpieces, the presently disclosed tubular welding wire 50 may generally improve the stability and control the penetration of the arc 34 such that a good weld may be achieved despite the zinc coating on the outside of the workpiece 22. Additionally, by improving the stability of the arc 34, the disclosed tubular welding wire 50 may generally enable the welding of thinner workpieces than may be possible using other welding electrodes. For example, in certain embodiments, the disclosed tubular welding wire 50 may be used to weld metal having an approximately 14-, 16-, 18-, 20-, 22-, 24-gauge, or even thinner workpieces. For example, in certain embodiments, the disclosed tubular welding wire 50 may enable welding workpieces having a thickness less than approximately 5 mm, less than 3 mm, or even less than approximately 1.5 mm.

Furthermore, the presently disclosed tubular welding wire 50 enables welding (e.g., welding of thin gauge galvanized steels) at travel speeds in excess of 30 or even 40 inches per minute. For example, the tubular welding wire 50 readily enables high quality fillet welds at travel speeds above 40 inches per minute (e.g., 35 or 45 inches per minute) with low weld porosity. That is, the presently disclosed tubular welding wire 50 may enable higher (e.g., 50% to 75% higher) travel speeds than other solid-cored, metal-cored, or flux-cored welding wires. It should be appreciated that higher travel speeds may enable higher production rates (e.g., on a production line) and reduce costs. Additionally, the presently disclosed tubular welding wire 50 exhibits good gap handling and provides excellent weld properties (e.g., strength, ductility, appearance, and so forth) using a wide operating process window. Further, the tubular welding wire 50 generally produces less smoke and spatter than other solid-cored, metal-cored, or flux-cored welding wires.

Furthermore, the disclosed tubular welding wire 50 may also be combined with certain welding methods or techniques (e.g., techniques in which the welding electrode moves in a particular manner during the weld operation) that may further increase the robustness of the welding system 10 for particular types of workpieces. For example, in certain embodiments, the welding torch 18 may be configured to cyclically or periodically move the electrode in a desired pattern (e.g., a circular, spin arc, or serpentine pattern) within the welding torch 18 in order to maintain an arc 34 between the tubular welding wire 50 and the workpiece 22 (e.g., only between the sheath 52 of the tubular welding wire 50 and the workpiece 22). By specific example, in certain embodiments, the disclosed tubular welding wire 50 may be utilized with welding methods such as those described in U.S. Provisional Patent Application Ser. No. 61/576,850, entitled "DC ELECTRODE NEGATIVE ROTATING ARC WELDING METHOD AND SYSTEM,"; in U.S. patent application Ser. No. 13/681,687, entitled "DC ELECTRODE NEGATIVE ROTATING ARC WELDING METHOD AND SYSTEM"; and in U.S. Provisional Patent Application Ser. No. 61/676,563, entitled "ADAPTABLE ROTATING ARC WELDING METHOD AND SYSTEM"; which are all incorporated by reference herein in their entireties for all purposes. It should be appreciated that such welding techniques may be especially useful when welding thin workpieces (e.g., having 20-, 22-, or 24-gauge thickness), as mentioned above.

FIG. 3 illustrates an embodiment of a process 60 by which a workpiece 22 may be welded using the disclosed welding system 10 and tubular welding wire 50. The illustrated process 60 begins with feeding (block 62) the tubular welding electrode 50 (i.e., the tubular welding wire 50) to a welding apparatus (e.g., welding torch 18). As set forth above, in certain embodiments, the tubular welding wire 50 may include one or more organic stabilizer components (e.g., sodium carboxymethyl cellulose), one or more carbon components (e.g., graphite powder), and one or more rare earth components (e.g., rare earth silicide). Further, the tubular welding wire 50 may have an outer diameter between approximately 0.024 in and approximately 0.062 in, between approximately 0.030 in and approximately 0.060 in, between 0.035 in and approximately 0.052 in, or approximately 0.040 in. It may also be appreciated that, in certain embodiments, the welding system 10 may feed the tubular welding wire 50 at a suitable rate to enable a travel speed greater than 30 in/min or greater than 40 in/min.

Additionally, the process 60 includes providing (block 64) a shielding gas flow (e.g., 100% argon (Ar), 100% carbon dioxide ($CO_2$), 75% Ar/25% $CO_2$, 90% Ar/10% $CO_2$, 95% Ar/5% $CO_2$, or similar shielding gas flow) near the contact tip of the welding apparatus (e.g., the contact tip of the torch 18). In certain embodiments, the shielding gas flow may include at least 90% (e.g., at least 95%, at least 98%, at least 99%) Ar. In other embodiments, welding systems may be used that do not use a gas supply system (e.g., such as the gas supply system 16 illustrated in FIG. 1) and one or more components (e.g., potassium carbonate) of the tubular welding wire 50 may decompose to provide a shielding gas component (e.g., carbon dioxide).

Next, the tubular welding wire 50 may be brought near (block 66) the workpiece 22 to strike and sustain an arc 34 between the tubular welding wire 50 and the workpiece 22. It should be appreciated that the arc 34 may be produced using, for example, a DCEP, DCEN, DC variable polarity, pulsed DC, balanced or unbalanced AC power configuration for the GMAW system 10. Once the arc 34 has been established to the workpiece 22, a portion of the tubular welding wire 50 (e.g., filler metals and alloying components) may be transferred (block 68) into the weld pool on the surface of the workpiece 22 to form a weld bead of a weld deposit. Meanwhile, the remainder of the components of the tubular welding wire 50 may be released (block 70) from the tubular welding wire 50 to serve as arc stabilizers, slag formers, and/or deoxidizers to control the electrical characteristics of the arc and the resulting chemical and mechanical properties of the weld deposit.

By specific example, it is believed that, for certain embodiments, the Group I or Group II metals (e.g., potassium and sodium ions) of the organic stabilizer may generally separate from the organic stabilizer and provide a stabilization effect to the arc. Meanwhile, it is believed that the organic portion (e.g., comprising at least carbon and hydrogen, but possibly including oxygen) may decompose under the conditions of the arc to provide a reducing (e.g., rich in hydrogen) atmosphere at or near the welding site. Accordingly, while not desiring to be bound by theory, it is believed that the resulting reducing atmosphere, and in potential combination with the Group I/Group II stabilizing metals, the rare earth components, cyclical motion, and so forth, presently disclosed, provides a welding solution enabling high travel speeds and low-porosity, even when welding coated workpieces or performing gap fills. For example, in certain embodiments, the tubular welding wire 50 may generally enable the welding of thinner workpieces as well as painted, galvanized, galvannealed, plated, aluminized, chromed, carburized, or other similar coated workpieces. For example, certain embodiments of the presently disclosed tubular welding wire 50 may enable welding workpieces having thicknesses less than 5 mm or less than 4 mm, or workpieces having thicknesses of approximately 1.3 mm or 1.2 mm, while maintaining high travel speed (e.g., in excess of 30 in/min) and low-porosity, even when performing gap fills (e.g., 1-3 mm gap fills).

Results for an example all-weld metal welding experiment using two embodiments of the disclosed tubular welding wire 50 (i.e., FabCOR® F6 and FabCOR® F6 LS, both available from Hobart Brothers Company, Troy, Ohio) according to the process 60 is set forth below in Table 1. It should be appreciated that the weld chemistry illustrated in Table 1 accounts for certain components of the weld metal (e.g., approximately 3% of the total weld metal) with the remaining percentage provided by iron. As shown in Table 1, the Charpy-V-Notch values for the resulting weld is at least approximately 20 ft. lbs. (e.g., at least approximately 25 ft. lbs., at least approximately 30 ft lbs., at least approximately 40 ft. lbs.) at approximately −20° C. and/or at approximately −40° C. In certain embodiments, the Charpy-V-Notch values of a weld formed using the disclosed tubular welding wire 50 may generally range between approximately 20 ft. lbs. and approximately 50 ft. lbs. Additionally, for the experiment illustrated in Table 1, the resulting weld afforded an ultimate tensile strength (UTS) of at least approximately 70 kilopounds per square inch (kpsi) (e.g., greater than 80 kpsi, greater than 90 kpsi, greater than 100 kpsi), a yield strength (YS) of at least approximately 70 kpsi (e.g., greater than 80 kpsi, greater than 90 kpsi, greater than 100 kpsi), and an elongation of at least approximately 18% (e.g., between approximately 18% and approximately 30%). For example, in other embodiments, the elongation of the weld deposit may be at least 22%. In general, the FabCOR® F6 welding wire demonstrated lower spatter and superior wetting compared to FabCOR® F6 LS, when performing a welding operation according to the process 60.

TABLE 1

Results of welding experiment using an embodiment
of tubular welding wire 50 according to AWS A5.18
groove weld tests. It may be appreciated that the
list is not exhaustive, and that the remainder of
the weld metal may include iron and trace elements.

| Parameters | | |
|---|---|---|
| Specification | AWS A5.18; ASME SFA-5.18 | |
| Base Plate | A36 | |
| Shielding Gas | 100% Ar | |
| Wire Diameter | 0.35 inches | |
| Wire Feed Speed | 425 inches per minute | |
| Number of layers/passes | 6 layers/15 passes | |
| Welding Wire | FabCOR ® F6 | FabCOR ® F6 LS |
| Properties | | |
| UTS (kpsi) | 106 | 94.6 |
| YS (kpsi) | 96.4 | 83.6 |
| % Elongation | 21.8 | 18.3 |
| CVN (ft. lbs. at −20° C.) | 41 | 46.3 |
| CVN (ft. lbs. at −40° C.) | 30 | 23 |
| Chemistry | | |
| Carbon | 0.099 | 0.114 |
| Manganese | 1.949 | 1.37 |
| Phosphorus | 0.006 | 0.007 |
| Sulfur | 0.016 | 0.014 |
| Silicon | 1.124 | 0.965 |
| Copper | 0.046 | 0.066 |
| Chromium | 0.046 | 0.045 |
| Vanadium | 0.001 | 0.001 |
| Nickel | 0.023 | 0.024 |
| Molybdenum | 0.011 | 0.011 |
| Aluminum | 0.015 | 0.017 |
| Titanium | 0.047 | 0.043 |
| Niobium | 0.002 | 0.001 |
| Cobalt | 0.003 | 0.002 |
| Boron | 0.0015 | 0.0007 |
| Tungsten | 0.001 | 0.001 |
| Tin | 0.01 | 0.011 |
| Lead | 0.001 | N/A |
| Zirconium | 0.003 | 0.002 |
| Antimony | 0.003 | 0.001 |
| Arsenic | 0.004 | 0.004 |

Furthermore, it may be appreciated that the present approach enables low-porosity (e.g., a low surface porosity and/or low total porosity) welds to be attained at high travel speed (e.g., in excess of 30 in/min or 40 in/min), even when welding coated workpieces. In certain embodiments, the low-porosity enabled by the presently disclosed tubular welding wire 50 may provide a weld that is substantially non-porous. In other embodiments, the disclosed tubular welding wire 50 may provide a low-porosity weld having only small voids or pores (e.g., less than approximately 1.6 mm in diameter) that are separated from one another by a distance greater than or equal to the respective diameter of each pore. Further, in certain embodiments, the porosity may be represented as a sum of the diameters of the pores encountered per distance of the weld in a direction (e.g., along the weld axis). For such embodiments, the weld may have a porosity less than approximately 0.3 inches per inch of weld, less than approximately 0.25 inches per inch of weld, less than approximately 0.2 inches per inch of weld, or less than approximately 0.1 inches per inch of weld. It may be appreciated that the porosity of the weld may be measured using an X-ray analysis, microscope analysis, or another suitable method.

Tables 2 and 3 present the results of example welding operations of Zn-coated workpieces using an embodiment of the tubular welding wire 50 at relatively high travel speeds (i.e., 40 inches per minute) using different welding conditions. The varied welding conditions of the indicated examples include: welding polarity (e.g., DCEN or DCEP), welding process (e.g., constant voltage (CV) or pulsed, such as Miller AccuPulse™), and shielding gas (e.g., 90% Ar/10% $CO_2$ or 100% Ar). Length porosity and area porosity measurements of Table 3 are provided as a percentage of the porosity that would cause the weld deposit to fail radiographic (e.g., X-ray) acceptable standards based on the minimum size of circular indications and the minimum weld viewing area, in accordance with AWS A5.18 Radiographic Acceptance Standards.

For the examples indicated in Table 2, when the welding process is CV, then a 90% Ar/10% $CO_2$ shielding gas generally enables a lower spatter rate than 100% Ar. Similarly, for the examples of Table 2, when the welding process is pulsed DCEN, a 90% Ar/10% $CO_2$ shielding gas generally enables lower spatter than 100% Ar. However, the trend unexpectedly reverses when the welding process is pulsed DCEP, and a 100% Ar shielding gas not only enables a lower spatter rate than a 90% Ar/10% $CO_2$ shielding gas, but also results in less spatter than all of the other welding conditions listed on Table 2. In particular, for embodiments in which the combination of welding conditions include 100% Ar and pulsed DCEP, spatter levels may be between approximately 40% and approximately 90% lower (e.g., between approximately 50% and approximately 75% lower) when compared to the other welding conditions listed in Table 2. Accordingly, such embodiments enable welding operations in which less than approximately 10 wt % (e.g., less than approximately 9 wt %, less than approximately 8 wt %, less than approximately 7 wt %, approximately 6 wt %) of the wire 50 is converted to spatter while welding the Zn-coated workpiece, even at a relatively high travel rate (e.g., 40 inches per minute).

TABLE 2

Spatter rates for different welding wires during a GMAW
welding operation to form bead-on-plate (BOP) joints using
the indicated conditions and wire at a travel speed of 40
inches per minute. Spatter is indicated in units of grams
of spatter per 30 inches of weld deposit and also as a percentage
of the wire that is converted to spatter.

| Polarity | Process | Shielding Gas | Spatter (g/30") | Spatter (wt % of wire) |
|---|---|---|---|---|
| DCEN | CV | 90% Ar/10% $CO_2$ | 8.6 | 20.4 |
| DCEP | CV | 90% Ar/10% $CO_2$ | 23.6 | 56.0 |
| DCEN | CV | 100% Ar | 10.5 | 24.9 |
| DCEP | CV | 100% Ar | 13.3 | 31.5 |
| DCEN | Pulsed | 90% Ar/10% $CO_2$ | 9.0 | 20.9 |
| DCEP | Pulsed | 90% Ar/10% $CO_2$ | 4.9 | 10.9 |
| DCEN | Pulsed | 100% Ar | 23.5 | 46.9 |
| DCEP | Pulsed | 100% Ar | 3.0 | 6.0 |

As indicated in Table 3, when the welding polarity is DCEN, then a 90% Ar/10% $CO_2$ shielding gas generally enables lower length porosity than 100% Ar. When the welding polarity/process is CV DCEP, a 90% Ar/10% $CO_2$ shielding gas generally enables a lower length porosity than 100% Ar. However, the trend unexpectedly reverses when the welding process is pulsed DCEP, and a 100% Ar shielding gas enables lower length porosity than a 90% Ar/10% $CO_2$ shielding gas. In general, Table 3 indicates that, for embodiments in which the combination of welding conditions include 100% Ar and pulsed DCEP, both the length and area porosity are acceptably low, which is indicative of a sound weld deposit. Such embodiments enable the formation of weld deposits having a length porosity less than approximately 10% (e.g., less than approximately 9%, less than approximately 8%, less than approximately 7%, less than approximately 6% or approximately 5%) and an area porosity less than approximately 4% (e.g., less than approximately 3.5%, less than approximately 3%, less than approximately 2.5%, or approximately 2.2%). Further, visual inspection of the weld deposits indicate that, for such embodiments, silicon (Si) islands were distributed toward the toe of the weld deposit rather than distributed throughout the surface of the weld deposit.

TABLE 3

Porosity and Si island measurements for different welding wires during a GMAW welding operation using the indicated conditions and wire at a travel speed of 40 inches per minute. Porosity measurements are average values determined by analyzing three lap joints formed using the indicated wire. Si island analysis was performed visually using a microscope.

| Polarity | Process | Shielding Gas | Length porosity | Area porosity | Si islands |
| --- | --- | --- | --- | --- | --- |
| DCEN | CV | 90% Ar/10% $CO_2$ | 5.0% | 1.7% | distributed throughout the surface |
| DCEP | CV | 90% Ar/10% $CO_2$ | 9.6% | 2.6% | distributed throughout the surface but is small in size |
| DCEN | CV | 100% Ar | 15.0% | 3.0% | few islands on the surface |
| DCEP | CV | 100% Ar | 12.0% | 2.2% | big island on the crater only |
| DCEN | Pulsed | 90% Ar/10% $CO_2$ | 1.2% | 0.0% | distributed towards the toe of the weld |
| DCEP | Pulsed | 90% Ar/10% $CO_2$ | 5.4% | 1.2% | distributed towards the toe of the weld |
| DCEN | Pulsed | 100% Ar | 7.2% | 1.4% | big island on the crater only |
| DCEP | Pulsed | 100% Ar | 5.0% | 2.2% | distributed towards the toe of the weld |

Figure 4:
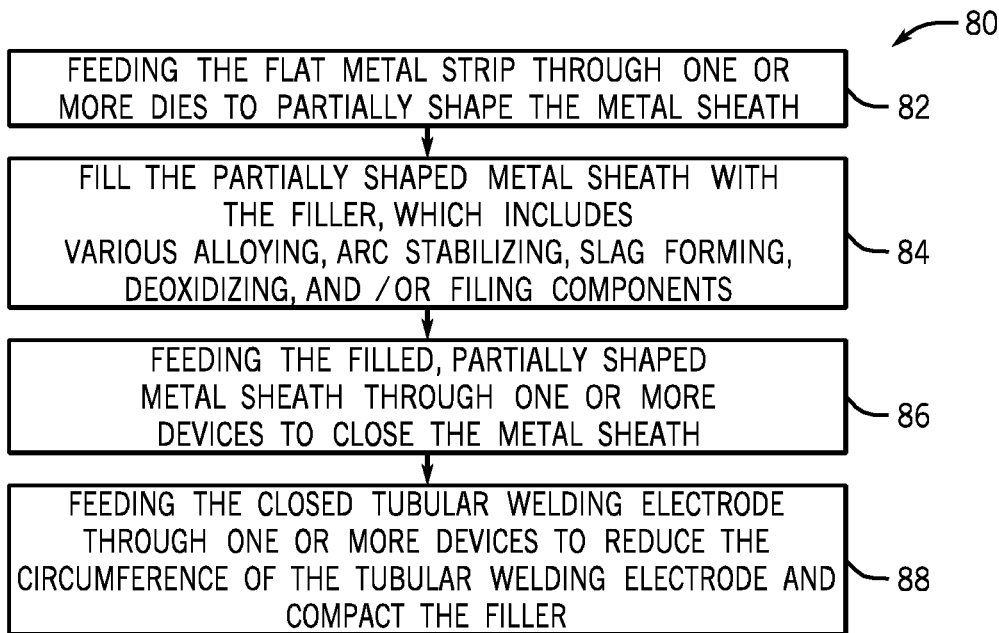
FIG. 4 is a process for manufacturing the tubular welding wire, in accordance with embodiments of the present disclosure.

FIG. 4 illustrates an embodiment of a process 80 by which the tubular welding wire 50 may be manufactured. It may be appreciated that the process 80 merely provides an example of manufacturing a tubular welding wire 50; however, in other embodiments, other methods of manufacturing may be used to produce the tubular welding wire 50 without spoiling the effect of the present approach. That is, for example, in certain embodiments, the tubular welding wire 50 may be formed via a roll-forming method or via packing the core composition into a hollow metallic sheath. The process 80 illustrated in FIG. 4 begins with a flat metal strip being fed (block 82) through a number of dies that shape the strip into a partially circular metal sheath 52 (e.g., producing a semi-circle or trough). After the metal strip has been at least partially shaped into the metal sheath 52, it may be filled (block 84) with the filler (e.g., the granular core 54). That is, the partially shaped metal sheath 52 may be filled with various powdered alloying, arc stabilizing, slag forming, deoxidizing, and/or filling components. For example, among the various fluxing and alloying components, one or more organic stabilizer components (e.g., sodium carboxymethyl cellulose), one or more carbon components (e.g., graphite powder), and one or more rare earth components (e.g., rare earth silicide) may be added to the metal sheath 52. Furthermore, in certain embodiments, other components (e.g., rare earth silicide, magnetite, titanate, pyrite, iron powders, and/or other similar components) may also be added to the partially shaped metal sheath 52.

Next in the illustrated process 80, once the components of the granular core material 54 have been added to the partially shaped metal sheath 52, the partially shaped metal sheath 52 may then be fed through (block 86) one or more devices (e.g., drawing dies or other suitable closing devices) that may generally close the metal sheath 52 such that it substantially surrounds the granular core material 54 (e.g., forming a seam 58). Additionally, the closed metal sheath 52 may subsequently be fed through (block 88) a number of devices (e.g., drawing dies or other suitable devices) to reduce the circumference of the tubular welding wire 50 by compressing the granular core material 54. In certain embodiments, the tubular welding wire 50 may subsequently be heated to between approximately 300° F. and approximately 650° F. for approximately 4 to 6 hours prior to packaging the tubular welding wire onto a spool, reel, or drum for transport, while, in other embodiments, the tubular welding wire 50 may be packaged without this baking step.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of forming a weld deposit on a zinc-coated workpiece, comprising:
    baking a tubular welding wire by heating the tubular welding wire to between approximately 300° F. and approximately 650° F.,
    feeding the tubular welding wire toward a surface of a galvanized workpiece, wherein the tubular welding wire is electrified with pulsed electropositive direct current (DCER), wherein the tubular welding wire is a metal-cored carbon steel or low-alloy steel tubular welding wire in accordance with American Welding Society (AWS) A5.18 or A5.36;
    directing a flow of shielding gas toward the surface of the galvanized workpiece near the tubular welding wire, wherein the flow of shielding gas consists essentially of argon (Ar) or a mixture of Ar and carbon dioxide ($CO_2$) that is at least 90% Ar; and
    forming the weld deposit on the zinc-coated workpiece using the tubular welding wire while providing the flow of shielding gas near the weld deposit,
    wherein the tubular welding wire comprises a granular core disposed inside of a metallic sheath, wherein the granular core comprises:
        an organic stabilizer component comprising one or more organic molecules or organic polymers bound to one or more Group I or Group II metals;
        a carbon component comprising graphite, graphene, carbon black, lamp black, carbon nanotubes, diamond, or a combination thereof, and an agglomerate comprising Group I or Group II metal oxides, titanium oxide, and manganese oxides; and wherein less than approximately 10 wt % of the tubular welding wire is converted to spatter while forming the weld deposit on the zinc-coated workpiece.

2. The method of claim 1, wherein the weld deposit has a length porosity less than approximately 10% and an area porosity less than approximately 4%.

3. The method of claim 2, wherein the length porosity is less than approximately 8% and the area porosity is less than approximately 3%.

4. The method of claim 3, wherein the length porosity is less than approximately 6% and the area porosity is less than approximately 2.5%.

5. The method of claim 4, wherein the flow of shielding gas consists essentially of Ar, and wherein less than approximately 9 wt % of the tubular welding wire is converted to spatter while forming the weld deposit on the zinc-coated workpiece.

6. The method of claim 5, wherein less than approximately 8 wt % of the tubular welding wire is converted to spatter while forming the weld deposit on the zinc-coated workpiece.

7. The method of claim 6, wherein less than approximately 7 wt % of the tubular welding wire is converted to spatter while forming the weld deposit on the zinc-coated workpiece.

8. The method of claim 1, wherein the flow of shielding gas consists essentially of at least 95% Ar and 5% or less $CO_2$.

9. The method of claim 1, wherein the flow of shielding gas consists essentially of at least 99% Ar and 1% or less $CO_2$.

10. The method of claim 1, wherein the weld deposit has a Charpy-V-Notch toughness greater than approximately 20 ft. lbs. at approximately −20° C. and at approximately −40° C.

11. The method of claim 10, wherein the Charpy-V-Notch toughness of the weld deposit is at least 30 ft. lbs. at approximately −20° C. and at approximately −40° C.

12. The method of claim 1, wherein the weld deposit has an ultimate tensile strength (UTS) of at least 70 kilopounds per square inch (kpsi), a yield strength (YS) of at least 70 kpsi, and a percent elongation of at least 18%.

13. The method of claim 1, wherein the tubular welding wire is the metal-cored carbon steel tubular welding wire in accordance with AWS A5.18 or A5.36.

14. The method of claim 1, wherein the tubular welding wire is the metal-cored low-alloy steel tubular welding wire in accordance with AWS A5.36.

15. The method of claim 1, wherein the tubular welding wire comprises a granular core disposed inside of a metallic sheath, wherein the granular core comprises:
one or more filler metals;
one or more alloying components;
one or more carbon components;
one or more alkali metal compound, alkali earth metal compounds, or a combination thereof, and
one or more organic stabilizer components comprising one or more organic molecules or organic polymers bound to one or more Group I or Group II metals.

16. The method of claim 15, wherein the one or more organic stabilizer components comprise between approximately 0.5% and 1% by weight of the granular core of the tubular welding wire.

17. The method of claim 1, wherein during baking the tubular welding wire is heated to between approximately 300° F. and approximately 650° F. for up to approximately 6 hours.

18. The method of claim 1, wherein during baking the tubular welding wire is heated to between approximately 300° F. and approximately 650° F. for between approximately 4 and 6 hours.

\* \* \* \* \*